May 12, 1936.  J. A. SERRELL  2,040,447

REMOTE CONTROL APPARATUS

Filed July 31, 1929  4 Sheets-Sheet 1

Inventor.
John A. Serrell
By
Attorney.

May 12, 1936.  J. A. SERRELL  2,040,447
REMOTE CONTROL APPARATUS
Filed July 31, 1929  4 Sheets-Sheet 2
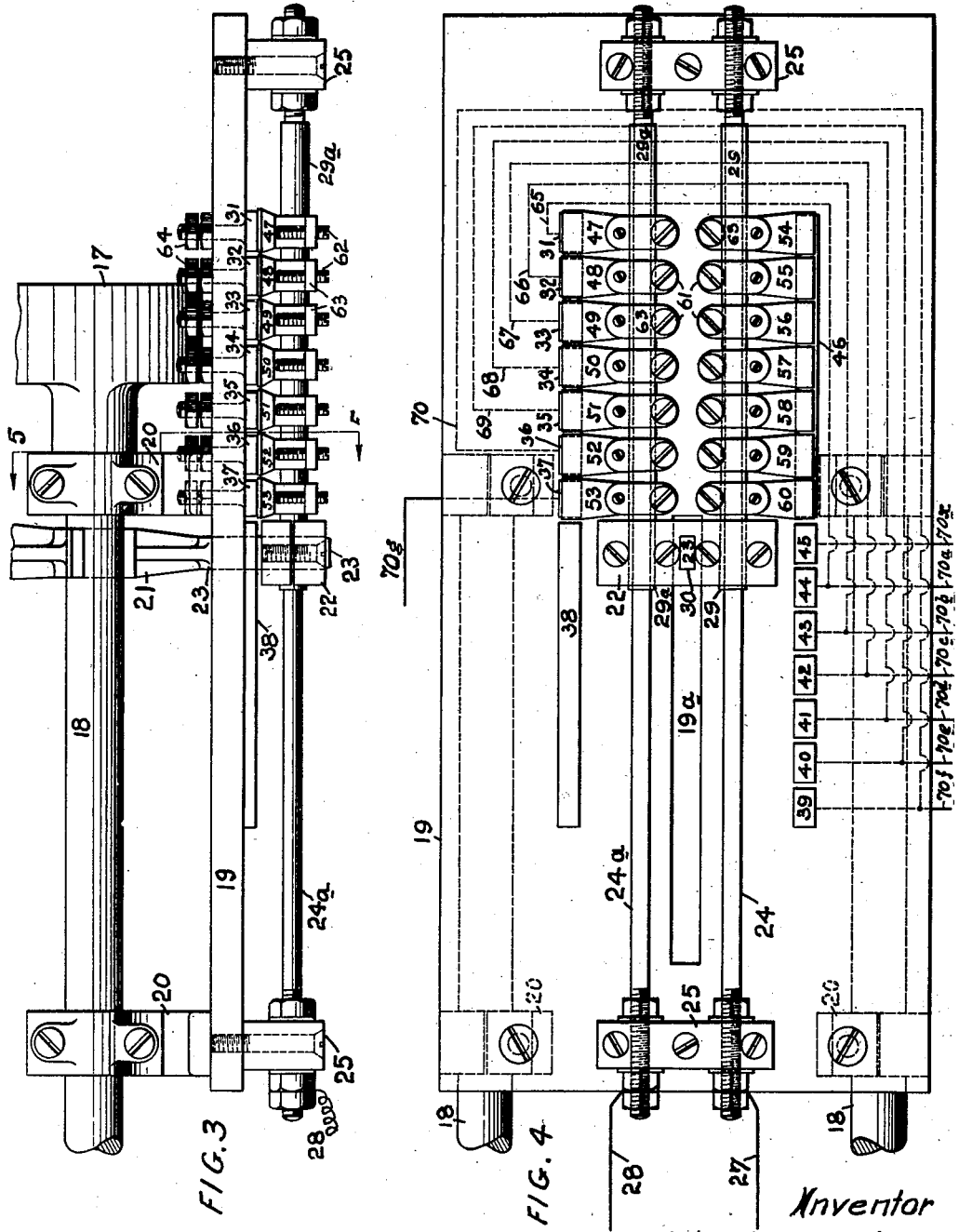
Inventor
John A. Serrell
By [signature]
Attorney.

May 12, 1936.    J. A. SERRELL    2,040,447
REMOTE CONTROL APPARATUS
Filed July 31, 1929    4 Sheets-Sheet 3
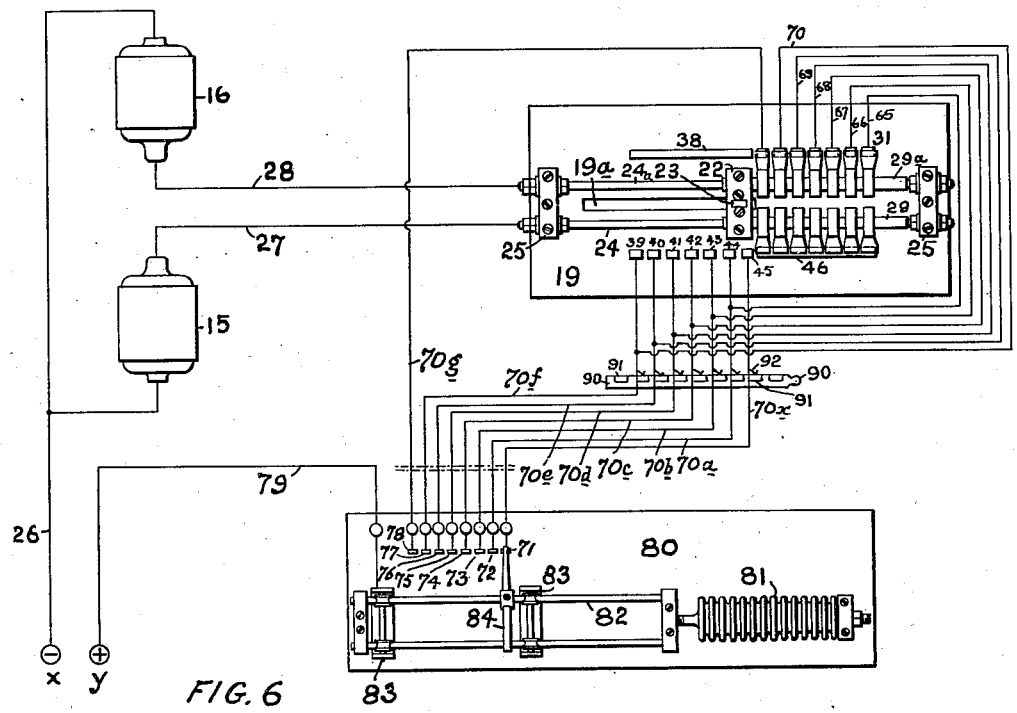
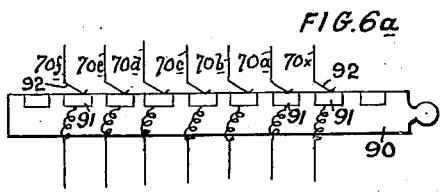
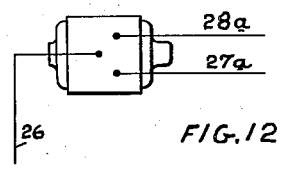
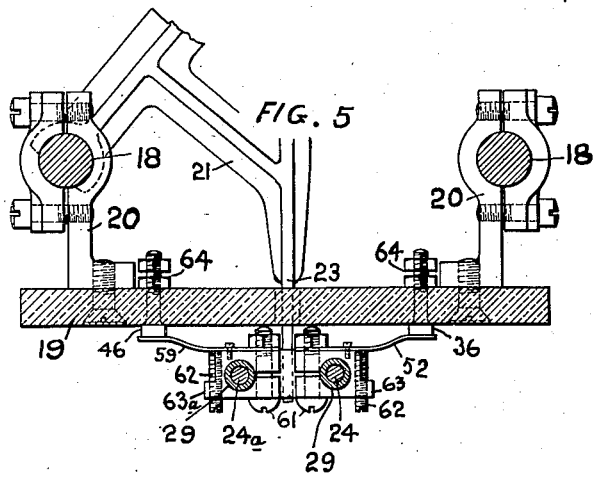
Inventor.
John A. Serrell
By
Attorney.

May 12, 1936.　　　J. A. SERRELL　　　2,040,447
REMOTE CONTROL APPARATUS
Filed July 31, 1929　　　4 Sheets-Sheet 4

Inventor.
John A. Serrell
By
Attorney.

Patented May 12, 1936

2,040,447

UNITED STATES PATENT OFFICE 2,040,447

REMOTE CONTROL APPARATUS

John A. Serrell, Passagrille, Fla., assignor to Warren Webster & Company, Camden, N. J., a corporation of New Jersey Application July 31, 1929, Serial No. 382,547

4 Claims. (Cl. 236—91)

The object of my invention is to provide a remote control apparatus adapted to put into and out of action or move a device at a distance, such as a valve mechanism or other device for the controlling of a heating medium, which requires to be operated from a distance and preferably to a varying degree, such as would be incident to a valve mechanism in a steam heating system in which the port was opened or closed to varying extents, said operation being manually or automatically controlled according to requirements.

My object is further to employ electrical means which may be manually or otherwise controlled automatically for operating the distantly located valve or other movable steam controlling part to which my improvements is directed.

A useful application of my improvements is that in which one or more supply valves of a steam heating apparatus may be operated under the control of a thermostat affected by changes of temperature, a preferable form of which construction contemplates that the thermostats shall be affected by temperature changes in or under the control of the outside atmosphere, and said improvements utilized for the purpose of adjusting the supply valves in the mains or branches of the heating system, whereby more or less steam may be supplied to the system as a whole and to the radiators thereof in groups, for maintaining a predetermined temperature within the building.

With the above and other objects in view, the nature of which will be more fully understood from the description hereinafter, the invention consists in the novel construction of remote control apparatus and its application to heating purposes, as hereinafter more fully described and defined in the claims.

Figure 1:
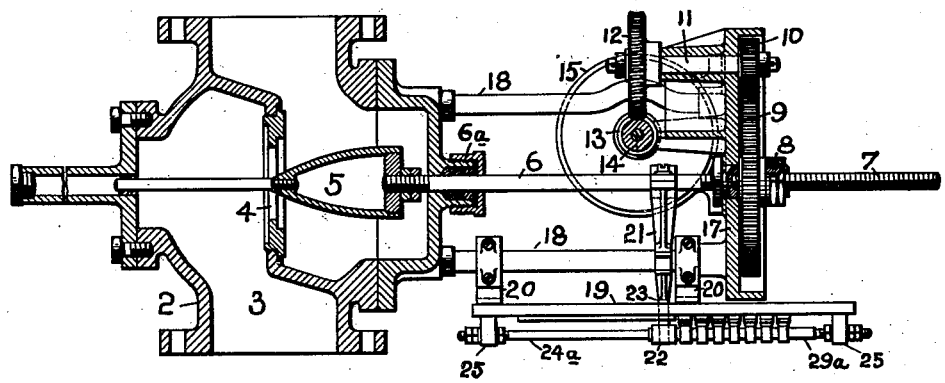
Figure 2:
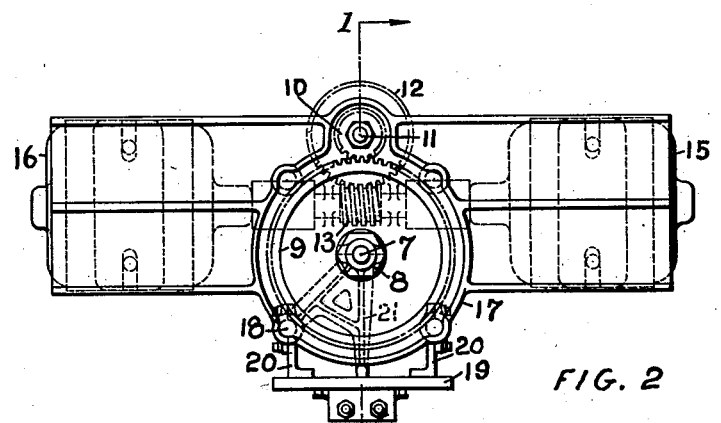
Figure 11:
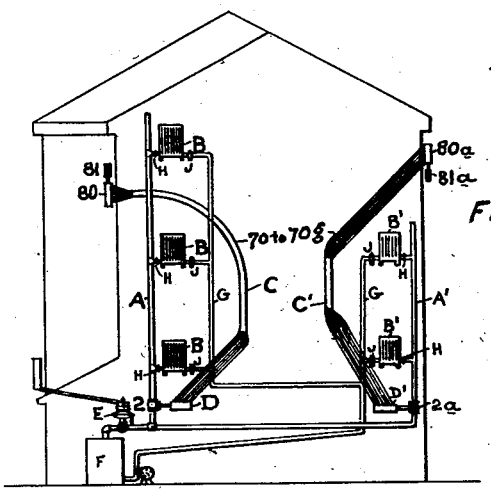
Figure 7:
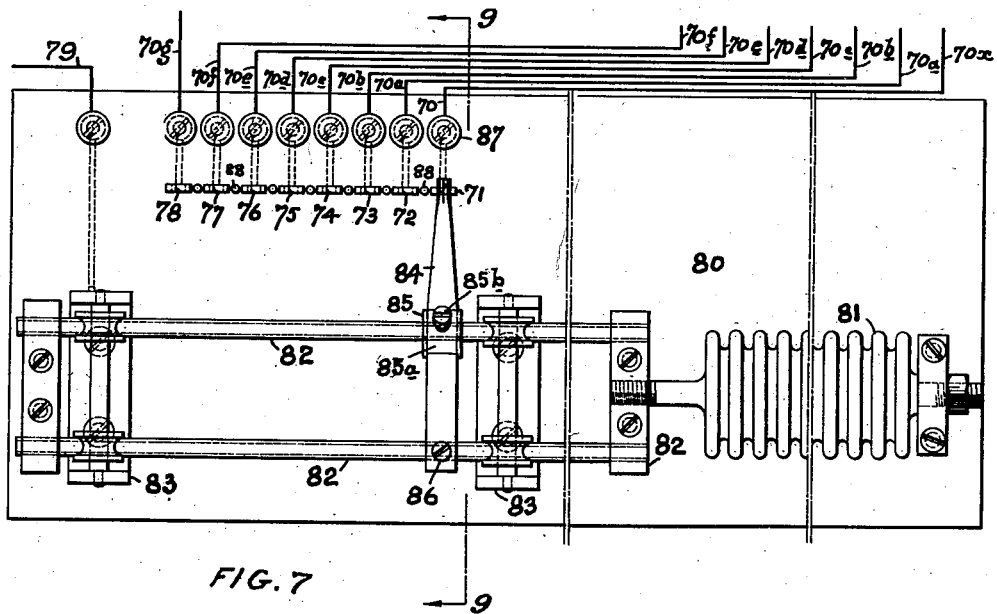
Figure 8:
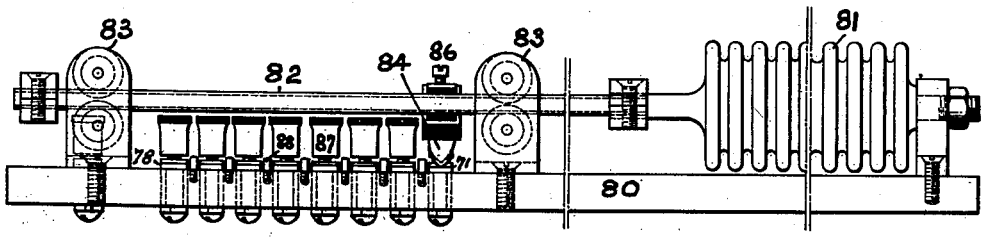
Figure 9:
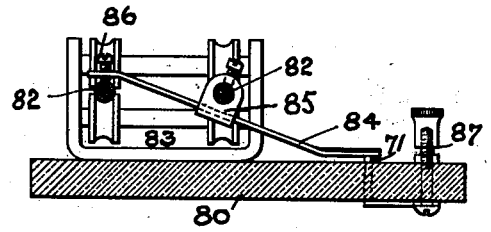
Figure 10:
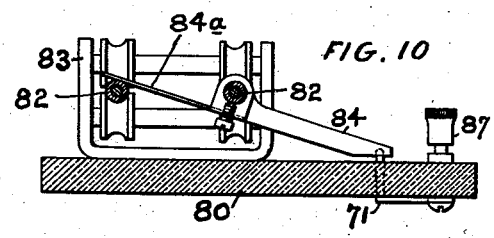

Referring to the drawings: Fig. 1 is a vertical section, taken on line 1—1 of Fig. 2, of a valve device to which my improvements are applied; Fig. 2 is an end view of the same; Fig. 3 is an enlarged front view of a portion of the structure shown in Fig. 1; Fig. 4 is a plan view of the mechanism shown in Fig. 3; Fig. 5 is a transverse vertical section of the same, taken on line 5—5 of Fig. 3; Fig. 6 is a diagrammatic view showing the details of the apparatus of Fig. 4, associated with the thermostatic control devices and additional electric circuits, including the electric motors; Fig. 6a and 7 are enlarged views of portions of Fig. 6; Fig. 8 is a side view of the structure shown in Fig. 7; Fig. 9 is a sectional view on line 9—9 of Fig. 7; Fig. 10 is a sectional view similar to Fig. 9, but illustrating a modification thereof; Fig. 11 is a diagrammatic elevation showing the application of my improvements to steam heating control; and Fig. 12 illustrates a reversible electric motor.

The application of my improvements will be better understood by a general reference to Fig. 11 before entering into the detail description of the special apparatus for remote control of the supply valves. F is a source of heat supply, such as a boiler, and from which the heating medium or steam may pass by a large main to the branch mains or risers A, A'; and the pressure and total quantity of said heating medium supplied may be regulated by a thermostatically controlled pressure reducing valve E to provide a varying pressure and quantity required, irrespective of the pressure variations at the source of generation. The branch mains A, A', are shown as supplying steam to two groups of radiators B, B', the steam being supplied to the radiators preferably through orifice control means H, and the water of condensation and air passing through return valves J into the return pipes G, and thence to the boiler, in any convenient manner. The return valves J may be thermostatically operated or otherwise, for permitting passage of air and water of condensation, but restricting the passage of steam. The branch mains A, A', are respectively provided with control valve devices 2 and 2a, similar to the construction shown in Figs. 1 and 2. These valve devices are respectively controlled by means indicated at D which include the operative mechanism for the valves 2 illustrated in Figs. 1 to 6, inclusive. Moreover, these valve devices may be separately controlled by thermostatic means 81 and 81a, respectively, as represented more fully in Figs. 6, 7 and 8. Parts 80 and 80a represent circuit controlling devices movable under the action of the respective thermostats 81, 81a, and controlling the electric circuits indicated by the cables C, C', forming electrical communication between the thermostatically controlled devices and the operative mechanism for the respective valves 2, 2a. The electric cables C, C', include in each case circuits 70 to 70g shown in Fig. 6, leading from circuit controlling devices 80 to the part D, namely, that which includes the operative mechanisms for the valve 2 illustrated in Figs. 1 to 6, inclusive. It may be understood that the main A supplies steam to a group of radiators B for maintaining a predetermined temperature at one side or zone of the building and its valve 2 controlled by the thermostat 81 corresponding to the outside temperature conditions prevailing at that side of the building, whereas the steam supplied by the branch pipe or riser A' supplies steam to another group of radiators B which, for example, may control the temperature within a building adjacent to another exposure; and wherein also the control valve 2a for supplying steam to the branch main A' is controlled by the thermostat 81a corresponding to the outside temperature conditions prevailing at that side of the building. In this manner, the two groups of radiators may be separately controlled in accordance with the particular requirements in each case, and yet they are receiving their steam supply from a common source. It will be manifest, however, that while said valve mechanisms 2 and 2a are automatic in their control under the varying outside temperature changes, they may, nevertheless, be manually controlled, if so desired, as hereinafter explained.

Referring more particularly to Figs. 1 and 2, the valve operating mechanism is shown as comprising the following parts: 2 is the valve body having the thorofare 3 in which is located an orifice 4 corresponding to the usual position of a valve seat. 5 is the valve piece and by means of a valve rod 6 sliding through a stuffing box 6a on the valve body, the said valve piece 5 may be adjusted within the valve orifice 4 by a step by step movement forward or backward, according to requirements. By making the step by step movements of short length, the adjustment of the valve piece approximates a continuous movement in being shifted within the orifice 4, but I do not restrict myself as to the length of movement of the increments of the step by step adjustments thus provided.

17 is a frame secured to the valve body by four studs 18 and in said frame is journaled a gear 9, said gear surrounding the threaded end 7 of the valve rod 6 and carrying within its hub a threaded bushing 8 which is caused to revolve about the threaded end 7 of the valve rod and thus move it longitudinally forward or backward. An arm 21, clamped to the valve rod 6 and guided upon one of the studs 18, operates to hold the valve rod against rotation while permitting its adjustment longitudinally. The gear 9 is driven by a pinion 10 secured to a rotatable shaft 11 journaled in the frame 17 and carrying at its other end a worm wheel 12 by which it is given a rotary motion. The worm wheel 12 is driven by a worm 13 secured to a motor shaft 14, which latter is rotated either clockwise or anti-clockwise, respectively, by the motor 15 and 16, which are secured to and carried by the aforesaid frame 17. It will be seen that by use of this speed reducing gearing, the motors may rotate at a reasonably high speed while the movement imparted to the valve piece and valve rod is relatively slow, which is as it should be, since variations in the flow through the valve should be caused in a gradual manner. The frame 17 and the lower studs 18 carry in addition to the parts above described, a material portion of the selector control mechanism which is more fully shown in Figs. 3, 4, 5 and 6, of the drawings, and which will be next described.

Depending from the lower studs 18 by means of clamps 20, I provide an insulating table 19 upon the underside of which are arranged two parallel rows of contacts and in alinement therewith there are respectively arranged a dead guide strip for each series of contacts. Referring to Figs. 3 and 4, one series of these contact blocks are respectively numbered 31 to 37, inclusive, and the dead guide strip 38 is arranged in alinement with the said contacts 31 to 37. Similarly, there is a second set of contacts 39 to 45, inclusive, and arranged in alinement therewith there is the dead guide block 46. It will also be observed that the contacts 31 to 37, and their associated guide strip 38, are arranged in the inverse order which exists in respect to the contact blocks 39 to 45, inclusive, and their associated dead guide strip 46. Arranged upon the bottom of the insulating table 19 are two guide rods 24 and 24a, the same being clamped in insulating supports 25. These guide rods also act as electrical conductors respectively delivering current to the wires 27 and 28 which are in communication with the motors 15 and 16. These rods 24 and 24a also act as rails for a carriage comprising two metal tubes 29 and 29a sleeved upon the rods and mechanically clamped or otherwise secured to a connecting body 22 of insulating material, such, for example, as vulcanite fiber. This carriage is moved along the guide rods by an extension 23 of the frame 21, said extension being movable along a slot 19a in the table 19 and engaging socket 30 in the carriage body 22. Clamped respectively upon the tubes 29 and 29a are a plurality of contact carrying blocks 63 and 63a, there being in the illustration shown seven such blocks for each tube. These blocks 63 and 63a may be of metal and of a split construction with clamping screws 61 for clamping them to the tubes (Fig. 5). The plurality of blocks 63 are respectively provided with yielding contact fingers 47 to 53, which are spring pressed upon the contact blocks 31 to 37 under the influence of the adjusting screws 62. Similarly, the adjustable blocks 63a, clamped to the tube 29, carry yielding contact fingers 54 to 60, which are adapted to be spring pressed upon the contact blocks 39 to 45, inclusive. The position of the carriage 22, 29 and 29a in Figs. 3 and 4, correspond with the position of the parts in Figs. 2 and 3, and hence the valve piece 5 is fully opened.

Referring to Figs. 3, 4, 5 and 6, the wiring comprises the following features: The contact blocks 31 to 36, inclusive, are inversely connected by circuits 65 to 70, inclusive, with contact blocks 39 to 44, inclusive. Contact block 37 is connected to circuit 70g leading to and connecting with contact block 78 of the thermostatic control mechanism 80, (Figs. 6 and 7). Similarly, contact block 45 is connected by circuit 70x with contact block 71 of the thermostatic control mechanism 80. Furthermore, the circuits 65 to 70 are respectively connected by circuits 70a to 70f, inclusive, with contact blocks 72 to 77, inclusive, of the thermostatic control mechanism 80. It will also be understood that this connection electrically associated contact blocks 72 to 77 of the thermostatic control mechanism respectively with the contact blocks 31 to 36, inclusive, and 39 to 45, inclusive, in pairs, namely, contact block 72, for example, is coupled with contact blocks 31 and 44, and so on, throughout the series of the contact blocks 72 to 77 of the thermostatic control mechanism.

Referring now to the thermostatic control mechanism shown in Figs. 6, 7, 8 and 9, I provide a movable frame 82 guided upon guide rollers 83 whereby it moves parallel to the line of the contact blocks 70 to 78, inclusive, and moreover, is provided with a spring actuated contact finger 84. For convenience, this spring finger 84 is hinged upon the movable frame 82 by means of a yoke 85 and is positioned by a collar 85a clamped in adjusted position upon the frame 82 by a set screw 85b. The tension of the spring finger upon the contacts is secured by an adjusting screw 86 at the rear of the spring finger, all of which will be understood by reference to Figs. 7, 8 and 9.

Any other suitable contacting device, movable with the frame 82, may be employed in lieu of that shown, one such modification being illustrated in Fig. 10, in which the contacting finger 84 is of a rigid construction and the rear portion 84a is provided with elasticity and causes the finger 84 to yieldingly press upon the contact blocks 71, etc., of the thermostatic control mechanism.

While I have shown the contacts 71 to 78 as of uniform size and equally spaced apart, it will be understood that this is not essential; and in special cases, these contact blocks, employed in association with the thermostatically actuated contact finger, may be spaced otherwise, as for example, in cases where uneven intervals are desired to provide a differing ratio to the variations in temperature to which the thermostat is subjected.

The movable frame 82 is reciprocated by a thermostatic motor device 81, the same being located at some definite place whose variation in temperature is to be effective in causing the valve device to be operatively adjusted to respond to changes of atmospheric conditions, such, for example, as in a steam heating system (Fig. 11) wherein the supply of steam by the valve 2 to the heating system comprising the steam mains and radiators, is controlled in accordance with variations in temperature of the atmosphere outside of the building, or of any space whose temperature is commensurate with outside temperature changes. While I have shown an expansible bellows form of thermostat, this is by way of example only, as any other well known form of thermostat may be employed for causing movements of the adjustable frame 82.

Electricity is supplied from sources $x$ and $y$, the latter being connected by circuit 79 with the guides of the movable frame 82 and thereby with the adjustable contact finger 84 of the thermostatic control mechanism before referred to. The other source $x$ is in communication with the circuit 26 which is divided and connected with the two motors 16 and 15 before referred to, the former of which operates to close the valve 2 and the latter of which operates to open the valve. The motors 15 and 16, illustrated in Figs. 1, 2 and 6, are not reversible motors, but the circuits and switch mechanism is such that either motor is energized for operation or both cut out of action. When either motor is in operation, it drives the armature of the other motor but is not affected thereby. Instead of employing two motors to reverse the operation of the valve movement, a single reversible motor may be employed, as indicated in Fig. 12. In this case, the motor will rotate in one direction when energized by the circuits 26 and 27a, and in the other direction when energized by the circuits 26 and 28a. I, therefore, do not limit myself to the particular character of motor or motor mechanism for operating the valve piece or other device which is to be controlled.

In describing the construction of the contacts and contact finger of the thermostatic control apparatus, I have referred to the contact blocks 71 to 78, inclusive, as they are illustrated in Fig. 6, but there may be a slight refinement of these contact devices as illustrated in Figs. 7 and 8, wherein there is interposed between adjacent contact blocks projecting pins 88 (insulated or of insulating material) of somewhat higher elevation than the blocks as shown in Fig. 8, so that the contact finger 84 is caused to ride free of one block before it makes contact with the next block; and, moreover, in which the contact finger may have a reasonable amount of movement over each block before it snaps over the pin into contact with the next adjacent block, for each step of temperature variation, thereby giving to the device a step by step adjustment for every predetermined change in temperature, such as 10° temperature intervals, for example. I would point out that while there are only seven steps of adjustment for the entire movement of the thermostatically operated control devices, more or less of such steps may be employed, as preferred. For convenience in coupling up the electrical connections between the various blocks, I would point out that the contact blocks on the thermostatically controlled mechanism are provided with clamping terminals 87, as shown in Figs. 7, 8 and 9; and in respect to the contact blocks 31 to 37, inclusive, and 39 to 45, inclusive, clamping terminals are provided as indicated at 64 in Figs. 3 and 5, these being merely refinements of construction.

The operation will now be understood: Assuming that the parts are in the relative positions of adjustment shown and that the valve piece 5 is fully open, such as might be required where the temperature outside of the building is zero and where a maximum supply of steam is required by the radiators to maintain a temperature of 70° F. within the building, and assuming further, that the outside temperature has risen to a material extent, such as 10°, it will be manifest that the thermostatic motor member 81 will expand to a more or less corresponding extent and move the contact finger 84 from the contact 71 to the contact 72 (Fig. 6). It will then follow that the current will pass from source over circuit 79, thence through the finger 84 to contact 72, thence by circuits 70a and 65 to contact 31, thence by contact finger 47 to tube 29a of carriage 22, thence by guide rod 24a and circuit 28 to motor 16, and therefrom by circuit 26 to the source of current supply. This causes the motor 16 to be energized and operate to move the valve shaft 6 and its valve piece 5 in a direction to partly close the valve. The operation of the motor 16 brings about a movement of the carriage 22 in a direction to the left (Figs. 4 and 6), and to the extent of one block, contact 53 passing on to the insulated or "dead" guide block 38 and contact 47 leaving block 31 in open circuit and passing on to block 32. At the same time, contact 54 is caused to pass from the insulated or "dead" guide block 46 to and upon open circuit block 45. The motor 16 is then brought to rest. If the thermostatic motor element 81 continues to expand under additional rise in outside temperature, the spring contact finger 84 is moved from block 72 to block 73 and thereby causes the circuit 70b to be energized and supply current by circuit 66 to blocks 32 and 43. This results in again energizing the motor 16 and the valve piece 5 is further closed to an extent of another increment and the carriage 22 moved an additional step, bringing contact 47 to block 33 and contact 54 to block 44. If now the outside temperature became lowered 10°, thermostatic member 81 will contract, and contact finger 84 of the thermostatic motor mechanism 80 will automatically be moved from contact with block 73 back to block 72. The result of this is to supply current from the source through circuit 79 to contact finger 84, thence by circuit 70a to blocks 31 and 44. Block 31 is in open circuit, but the current passing by circuits 70a and 65 is supplied to block 44, thence by contact finger 54, tube 29 of carriage 22, guide rod 24, and circuit 27 to motor 15, and therefrom by circuit 26 to source. The result of this is that motor 15 is put into action to open the valve piece 5 to its original position, and in so doing, impart a corresponding movement to the carriage 22 and the contact fingers carried thereby.

It will now be seen that changes of temperature will cause a step by step adjustment in the opening and closing movements of the valve; and that the closing movement of the valve will always take place with an increase in the temperature, and similarly, an opening movement will take place whenever the temperature is lowered, and these changes may occur at any stage of the opening and closing steps or stages in operating the valve. Precisely the same results may be had by employing a single reversing motor, Fig. 12, in which rotation in one direction is assured by current from a circuit 28a (corresponding to circuit 28 in Fig. 6), and rotation in the other direction assured by current from circuit 27a (corresponding to circuit 27 of Fig. 6).

I have described the invention as adapted for automatic regulation or control, but it is not at all necessary to operate under automatic control, as will be readily understood from the following explanation. If we assume that the movable frame 82 is disconnected from the thermostatic motor bellows 81, and be shifted by hand, it is manifest that the shifting of the contact finger 84 over the blocks 71 to 78 will produce a step by step movement in the valve piece 5, whereby it may be opened or closed to any extent desired and held at any desired point of adjustment. The mechanism provides the essentials of a remote control device for any useful purpose. For example, wherein the automatic control shown is suitable for operating a main supply valve of a steam heating system, duplicates of the mechanism without the thermostat is well applicable for use in controlling zoning valves, such as employed for controlling heat supplied within a building adjacent to certain exposed walls to compensate for excessive loss of heat due to wind, shade, and character of exposure such as "northern" exposure as compared to a "southern" exposure. As a remote control means, the rod 6 may be employed for operating any mechanism where a full or fractional movement is required, and I, therefore, describe the means shown as an example only and not as a restriction.

There are times when it is desirable, in an automatic system, to increase the quantity of heat either to the whole building or a zoned portion thereof, and I provide a manually adjustable device for accomplishing this result. For example, if the set screw 85b is loosened and the collar 85a, together with the contact finger 84, is adjusted along the rods of the movable frame 82 to the extent of one or two of the contact blocks 71 to 78, and then clamped in position again, it will be apparent that for any adjustment of the contact finger 84 under the influence of the thermostatic motor means 81, the step by step movement of the valve piece will be continued as before, but with such adjustment a lesser quantity of steam will be passed by the valve into the heating system, and consequently the building as a whole will be heated to a lesser extent than that formerly required, and such lesser heating may be to compensate for exceptionally mild weather conditions. Reversely, if the weather was 30°, for example, and the contact finger 84 was, under thermostatic action, resting on contact block 74, and more heat was required, either for the whole building or for zoning purposes, the adjustment of the finger 84 upon the movable frame 82 to contact with block 73 would operate to supply more steam to the system than was formerly provided for under thermostatic control.

An adjustment of this character is especially useful where zoning control of a large building is required by a plurality of separate valve devices regulated by the remote control means of the present application, and wherein said zoning valves receive steam from a common source and are severally utilized to insure the proper distribution of the steam, increasing or decreasing supply of steam heat on one or more sides of the building due to the nature of exposure.

Another manner of accomplishing these results is to employ an adjustable slide 90 (Figs. 6 and 6a) having contacts 91 thereon which are also terminals of the conducting circuits 70a, 70b, 70c, 70d, 70e, and 70f, and employ it in cooperation with a plurality of fixed terminals 92 in respective electrical connection with circuits 65, 66, 67, 68, 69 and 70, and wherein the adjustment of the movable slide 90 longitudinally over the fixed terminals will cause a readjustment of the contact blocks 71 to 78, inclusive, in respect to the contact blocks 31 to 38, inclusive, and 39 to 45, inclusive. For instance, if the slide 90 is moved to the left so that its contacts 91 are brought into communication with the contacts 92 in such manner that circuit 70a is brought into communication with circuit 66, then for the operation of the thermostatic motor member 81, the electric motor 15 will be put under the influence of the contact block 43, with the result that the valve piece 5 will be closed to a greater extent for a given operation of the thermostatic motor device 81; but if, on the other hand, the adjustable slide 90 is moved to the right, then it is manifest that circuit 70b will be coupled with circuit 65 and contact block 31, in which case the electric motor 15 will be energized with the result that the valve piece 5 will be moved to the right and an increased quantity of steam admitted through the valve 2 for the normal functioning of the thermostatic motor 81.

These adjustable devices just described for increasing or decreasing the quantity of the steam supply for any given thermostatic control, may be termed a "variator" because it permits varying the maximum steam flow under automatic regulation.

From the foregoing description, it will be evident that I have provided means for supplying heating fluid to a building to be heated in proportion to the temperature difference between inside and outside of the building, and have also provided means for selectively varying the percentage of the normal amount of heating fluid delivered throughout the entire range of temperature differences for which the system is designed; that is to say, by the adjustments to the contact finger 84 upon the thermostatically operated movable frame 82 and by the provision of the adjustable contact device 90, the percentage of the predetermined normal amount of heating fluid to be delivered to the building may be selectively varied.

It will now be apparent that I have devised a novel and useful construction which embodies the features of advantage enumerated as desirable, and while I have in the present instance shown and described the preferred embodiment thereof which has been found in practice to give satisfactory and reliable results, it is to be understood that I do not restrict myself to the details as the same are susceptible of modification in various particulars, without departing from the spirit or scope of the invention.

Having now described my invention, what I claim and desire to secure by Letters Patent, is:

1. In an apparatus of the character stated, a building to be heated, radiators therefor, steam mains for supplying steam to said radiators, a main valve for controlling the supply of steam to the mains, and an electrically actuated power means for actuating the main valve, combined with a source of electric energy, thermostatically controlled means for supplying electricity from the source for intermittently putting the electrically actuated power means into intermittent action a given number of times during a predetermined range of temperature change, circuits and switch mechanism for supplying and controlling electric current to the power means with each change of expansion and contraction of the thermostatic member of the thermostatically controlled means and for shutting off the supply of electric current with each movement of the electrically actuated power means, and manually controlled means for changing the times of the intermittent operation of the electrically actuated power means with respect to the times of expansion and contraction of the thermostatic member, whereby the number of intermittent actions of the power means may be changed as compared to the given number of thermostatic changes covering the predetermined normal range of the thermostatically controlled means.

2. In an apparatus of the character stated, a building to be heated, radiators therefor, steam mains for supplying steam to said radiators, and a main valve for controlling the supply of steam to the mains, in combination with a movable part for actuating the main valve, thermostatically operated means for imparting to the movable part and valve an intermittent motion, means operable with the movement of the movable part for arresting the action of the thermostatically operated means after each motion imparted to the movable part, and manually controlled means for changing the number of movements of the movable part as compared to the number of intermittent actions of the thermostatically operated means over a predetermined normal range of temperature change.

3. The combination with a building, of a plurality of groups of radiators associated with different wall exposures of said building, a source of heat, branch mains leading from the source of heat to the respective groups of radiators, separate control valves in the respective branch mains for controlling the amount of heat supplied to the corresponding groups of radiators, separate thermostatically controlled means for each of the separate control valves, the thermostatic elements of which are respectively arranged to be subjected to the temperature conditions outside the building adjacent to the respective groups of radiators whereby different portions of the interior of the building may be heated to substantially the same extent, and pressure reducing means controlled thermostatically by exterior atmospheric changes for controlling the pressure and total quantity of heat conveyed from the source to the branch mains.

4. In an apparatus of the character stated, a building to be heated, radiators therefor, steam mains for supplying steam to said radiators, a main valve for controlling the supply of steam to the mains, and an electrically actuated power means for controlling the main valve, combined with a source of electric energy, thermostatically controlled means for controlling the supply of electricity from the source for causing the electrically actuated power means to be put into intermittent action for each of a predetermined unit temperature change, circuits and switch mechanism for inversely controlling the supply of electric current to the electrically actuated means for controlling the main valve with each unit change in temperature and for temporarily shutting off the supply of electric current with each complete movement of the electrically actuated power means, and wherein manually controlled means are provided for changing the time of intermittent operation of the electrically actuated power means with respect to both the time of expansion and time of contraction of the thermostat of the thermostatically controlled means, whereby the number of intermittent operations of the power means may be changed to increase the quantity of steam supplied when the temperature on the thermostatic means is increased, and reversely whereby the number of intermittent operations of the power means may be changed to decrease the quantity of steam supplied when the temperature on the thermostatic means is decreased.

JOHN A. SERRELL.